United States Patent
Mukherjee et al.

(10) Patent No.: US 10,736,092 B2
(45) Date of Patent: Aug. 4, 2020

(54) FIRST COMMUNICATION DEVICE AND METHODS THEREIN, FOR SENDING ONE OR MORE CONTROL SIGNALS TO A SECOND COMMUNICATION DEVICE

(71) Applicant: Telefonaktiebolaget LM Ericsson (publ), Stockholm (SE)

(72) Inventors: Amitav Mukherjee, Fremont, CA (US); Jung-Fu Cheng, Fremont, CA (US); Havish Koorapaty, Saratoga, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/108,630

(22) Filed: Aug. 22, 2018

(65) Prior Publication Data

US 2018/0359738 A1 Dec. 13, 2018

Related U.S. Application Data

(63) Continuation of application No. 15/116,239, filed as application No. PCT/SE2016/050612 on Jun. 22, 2016, now Pat. No. 10,085,248.

(60) Provisional application No. 62/205,036, filed on Aug. 14, 2015.

(51) Int. Cl.
*H04W 72/04* (2009.01)
*H04W 8/00* (2009.01)
(Continued)

(52) U.S. Cl.
CPC ......... *H04W 72/042* (2013.01); *H04W 8/005* (2013.01); *H04W 16/14* (2013.01); *H04W 72/0406* (2013.01); *H04W 74/0808* (2013.01)

(58) Field of Classification Search
CPC ... H04W 72/042; H04W 16/14; H04W 8/005; H04W 72/0406; H04W 74/0808
See application file for complete search history.

(56) References Cited

U.S. PATENT DOCUMENTS 10,085,248 B2 *  9/2018  Mukherjee ........ H04W 72/0406
2016/0050667 A1   2/2016  Papasakellariou et al.
(Continued)

FOREIGN PATENT DOCUMENTS

EP       2896263 A1      7/2015
KR       20150006049 A   1/2015
WO       2013177449 A1   11/2013

OTHER PUBLICATIONS

3GPP, "3rd Generation Partnership Project; Technical Specification Group Radio Access Network; Evolved Universal Terrestrial Radio Access (E-UTRA); Physical channels and modulation (Release 11)", 3GPP TS 36.211 V11.4.0, Sep. 2013, 1-120.
(Continued)

*Primary Examiner* — Phuc H Tran
(74) *Attorney, Agent, or Firm* — Murphy, Bilak & Homiller, PLLC (57) ABSTRACT

A method performed by a first communication device for sending one or more control signals to a second communication device. The first communication device and the second communication device operate in a wireless communications network. The first communication device determines, during a first period, that a transmission medium is available for sending the one or more control signals to the second communication device. The first communication device then sends, to the second communication device, the one or more control signals along with a discovery signal, via the transmission medium. The discovery signal and the one or more control signals are sent without data after the first period. The first period is shorter than a second period for determining that the transmission medium is available for sending the data.

16 Claims, 8 Drawing Sheets

(51) Int. Cl.
*H04W 16/14* (2009.01)
*H04W 74/08* (2009.01)

(56) References Cited

U.S. PATENT DOCUMENTS

| | | | |
|---|---|---|---|
| 2016/0192396 A1* | 6/2016 | Ng | H04W 74/0808 370/329 |
| 2016/0227476 A1 | 8/2016 | Yerramalli et al. | |
| 2017/0215202 A1* | 7/2017 | Yang | H04L 5/0048 |
| 2017/0265248 A1 | 9/2017 | Narasimha et al. | |
| 2018/0175975 A1* | 6/2018 | Um | H04L 1/1816 |
| 2018/0176944 A1* | 6/2018 | Wang | H04W 74/0808 |
| 2018/0213561 A1* | 7/2018 | Bhorkar | H04L 5/005 |
| 2018/0220303 A1* | 8/2018 | Futaki | H04W 48/18 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.4.0, Sep. 2013, 1-182.

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.5.0, Sep. 2013, 1-347.

ETSI, "Broadband Radio Access Networks (BRAN); 5 GHz high performance RLAN; Harmonized EN covering the essential requirements of article 3.2 of the R&TTE Directive", ETSI EN 301.893 V1.7.1, Jun. 2012, 1-90.

Unknown, Author, "DL control information signalling for LTE CA of up to 32 CCs", 3GPP TSG RAN WG1 #81 R1-152773 May 25-29, 2015 Fukuoka, Japan Source: Qualcomm Incorporated, May 25-29, 2015, 1-4.

Unknown, Author, "Draft Report of 3GPP TSG RAN WG1 #81 v0.2.0 (Fukuoka, Japan, May 25-29, 2015)", 3GPP TSG RAN WG1 Meeting #82 R1-15xxxx Beijing, China, Aug. 24-28, 2015, Aug. 24-28, 2015, 1-94.

Unknown, Author, "Status Report to TSG 1 Work plan related evaluation", 3GPP TSG RAN meeting #68 RP-150624 Malmö, Sweden, Jun. 15-18, 2015, Jun. 15-18, 2015, 1-18.

* cited by examiner

FIRST COMMUNICATION DEVICE AND METHODS THEREIN, FOR SENDING ONE OR MORE CONTROL SIGNALS TO A SECOND COMMUNICATION DEVICE

RELATED APPLICATIONS

This application is a continuation of U.S. application Ser. No. 15/116,239 filed 3 Aug. 2016, which is a U.S. National Phase Application of PCT/SE2016/050612 filed 22 Jun. 2016, which claims benefit of U.S. Provisional Application 62/205,036 filed 14 Aug. 2015. The entire contents of each aforementioned application is incorporated herein by reference.

TECHNICAL FIELD

Embodiments herein relate to a first communication device and methods therein for sending one or more control signals to a second communication device. Embodiments herein further relate to computer programs and computer-readable storage mediums, having stored thereon the computer programs to carry out these methods.

BACKGROUND

Communication devices such as terminals are also known as e.g. User Equipments (UE), mobile terminals, wireless terminals, wireless devices and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular or wireless communications network covers a geographical area which may be divided into cell areas, wherein each cell area may be served by an access node such as a base station, e.g. a Radio Base Station (RBS), which sometimes may be referred to as e.g. evolved NodeB "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

The 3GPP initiative "License-Assisted Access" (LAA) intends to allow an LTE equipment, such as a communication device, to also operate in the unlicensed 5 GigaHertz (GHz) radio spectrum. The unlicensed 5 GHz spectrum may be used as a complement to the licensed spectrum. Accordingly, communication devices may connect in the licensed spectrum, through e.g., a primary cell or PCell, and may use Carrier Aggregation (CA) to benefit from additional transmission capacity in the unlicensed spectrum, through e.g., a secondary cell or SCell. To reduce the changes required for aggregating licensed and unlicensed spectrum, the LTE frame timing in the PCell may be simultaneously used in the SCell.

Regulatory requirements, however, may not permit transmissions in the unlicensed spectrum without prior channel sensing. Since the unlicensed spectrum may be shared with other radios of similar or dissimilar wireless technologies, a so called Listen-Before-Talk (LBT) method may need to be applied. The LBT procedure may involve sensing a medium for a pre-defined minimum amount of time, and backing off if the channel is busy. Today, the unlicensed 5 GHz spectrum is mainly used by equipment implementing the Institute of Electrical and Electronics Engineers (IEEE) 802.11 Wireless Local Area Network (WLAN) standard. This standard is known under its marketing brand "Wi-Fi."

LTE

Figure 1:
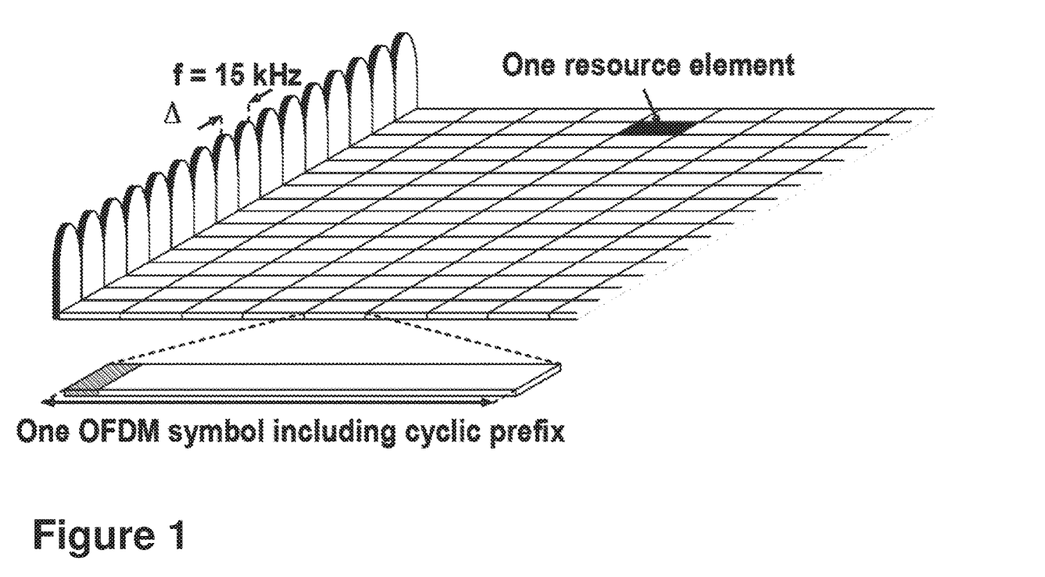
FIG. 1 is a schematic diagram illustrating the basic LTE DL physical resource.

LTE may use Orthogonal Frequency Division Multiplexing (OFDM) in the DL and Discrete Fourier Transform (DFT)-spread OFDM, also referred to as Single-Carrier Frequency Division Multiple-Access (SC-FDMA), in the UL. The basic LTE DL physical resource may thus be seen as a time-frequency grid as illustrated in FIG. 1, where each resource element corresponds to one OFDM subcarrier during one OFDM symbol interval. The UL subframe may have the same subcarrier spacing as the DL, and the same number of SC-FDMA symbols in the time domain as OFDM symbols in the DL. The subcarrier spacing has been chosen to be 15 kiloHertz (kHz), as shown. Each resource element may comprise a so-called cyclic prefix, which is involved in preventing inter-symbol interference.

Figure 2:
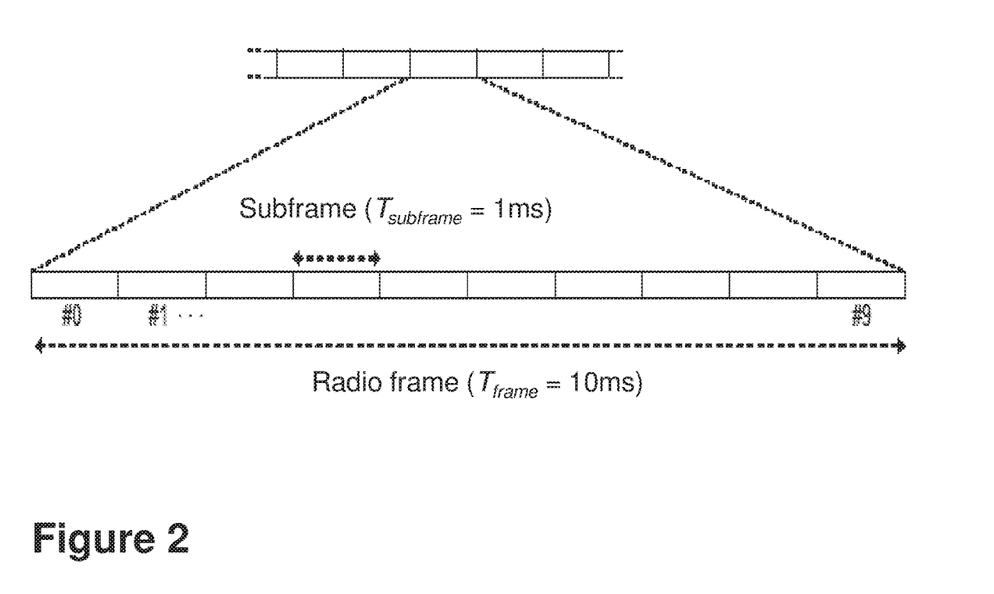
FIG. 2 is a schematic diagram illustrating the LTE time-domain structure.

In the time domain, LTE DL transmissions are organized into radio frames of 10 milliseconds (ms), each radio frame consisting of ten equally-sized subframes of length Tsubframe=1 ms as shown in FIG. 2, which illustrates the LTE time-domain structure. Each subframe comprises two slots of duration 0.5 ms each, and the slot numbering within a frame may range from 0 to 19. For normal cyclic prefix, one subframe may consist of 14 OFDM symbols. The duration of each symbol is approximately 71.4 microseconds (μs).

Furthermore, the resource allocation in LTE may typically be described in terms of resource blocks, where a resource block corresponds to one slot, 0.5 ms, in the time domain and 12 contiguous subcarriers in the frequency domain. A pair of two adjacent resource blocks in the time direction, 1.0 ms, may be known as a resource block pair. Resource blocks may be numbered in the frequency domain, starting with 0 from one end of the system bandwidth.

Figure 3:
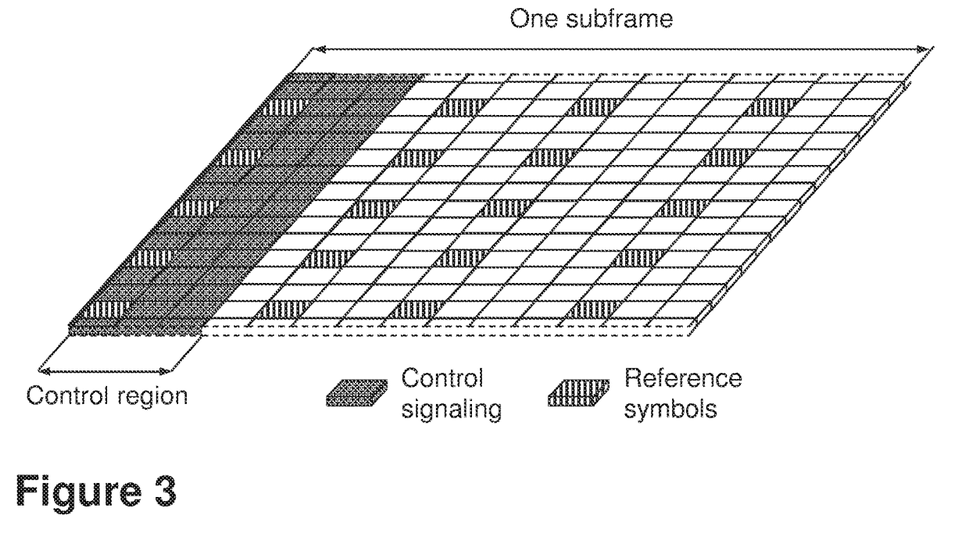
FIG. 3 is a schematic diagram illustrating a normal DL subframe in LTE.

Downlink transmissions may be dynamically scheduled, i.e., in each subframe the base station may transmit control information about which terminals data is transmitted to, and upon which resource blocks the data is transmitted, in the current DL subframe. This control signaling may be typically transmitted in the first 1, 2, 3 or 4 OFDM symbols in each subframe, and the number n=1, 2, 3 or 4 is known as the Control Format Indicator (CFI). The DL subframe may also contain common reference symbols, which may be known to the receiver, and used for coherent demodulation of e.g., the control information. A DL system with CFI=3 OFDM symbols as control region is illustrated in FIG. 3, which illustrates a normal DL subframe. The control region in FIG. 3 is shown as comprising control signaling, indicated by black squares, reference symbols, indicated by striped squares, and unused symbols, indicated by checkered squares.

From 3GPP LTE Release 11 onwards, the above described resource assignments may also be scheduled on the enhanced Physical Downlink Control Channel (EPDCCH). For Release 8 to Release 10, only Physical Downlink Control Channel (PDCCH) is available.

The reference symbols shown in the above FIG. 3 are the Cell-specific Reference Symbols (CRS) and they may be used to support multiple functions including fine time and frequency synchronization and channel estimation for certain transmission modes.

Physical Downlink Control Channel (PDCCH) and Enhanced PDCCH (EPDCCH)

The PDCCH and/or EPDCCH may be used to carry DL Control Information (DCI) such as scheduling decisions and power-control commands. More specifically, the DCI may include:

a) Downlink scheduling assignments, including the Physical DL Shared CHannel (PDSCH) resource indication, transport format, hybrid-Automatic Repeat reQuest (ARQ) information, and control information related to spatial multiplexing, if applicable. A DL scheduling assignment may also include a command for power control of the Physical Uplink Control CHannel (PUCCH) used for transmission of hybrid-ARQ acknowledgements in response to DL scheduling assignments.

b) Uplink scheduling grants, including Physical UL Shared CHannel (PUSCH) resource indication, transport format, and hybrid-ARQ-related information. An UL scheduling grant may also include a command for power control of the PUSCH.

c) Power-control commands for a set of terminals as a complement to the commands included in the scheduling assignments/grants.

One PDCCH and/or EPDCCH may carry one DCI message containing one of the groups of information listed above. As multiple terminals may be scheduled simultaneously, and each terminal may be scheduled on both DL and UL simultaneously, there may be a possibility to transmit multiple scheduling messages within each subframe. Each scheduling message may be transmitted on separate PDCCH and/or EPDCCH resources, and consequently, there may be typically multiple simultaneous PDCCH and/or EPDCCH transmissions within each subframe in each cell. Furthermore, to support different radio-channel conditions, link adaptation may be used, where the code rate of the PDCCH and/or EPDCCH may be selected by adapting the resource usage for the PDCCH and/or EPDCCH, to match the radio-channel conditions.

Here follows a discussion on the start symbol for PDSCH and EPDCCH within the subframe. The OFDM symbols in the first slot may be numbered from 0 to 6. For transmissions modes 1-9, the starting OFDM symbol in the first slot of the subframe for EPDCCH may be configured by higher layer signaling and the same may be used for the corresponding scheduled PDSCH. Both sets may have the same EPDCCH starting symbol for these transmission modes. If not configured by higher layers, the start symbol for both PDSCH and EPDCCH may be given by the CFI value signaled in the Physical Control Format Indicator CHannel (PCFICH).

Multiple OFDM starting symbol candidates may be achieved by configuring a UE in transmission mode 10, by having multiple EPDCCH Physical Resource Block (PRB) configuration sets where for each set the starting OFDM symbol in the first slot in a subframe for EPDCCH may be configured by higher layers to be a value from $\{1,2,3,4\}$, independently for each EPDCCH set. If a set is not higher layer configured to have a fixed start symbol, then the EPDCCH start symbol for this set may follow the CFI value received in the PCFICH.

Carrier Aggregation

Figure 4:
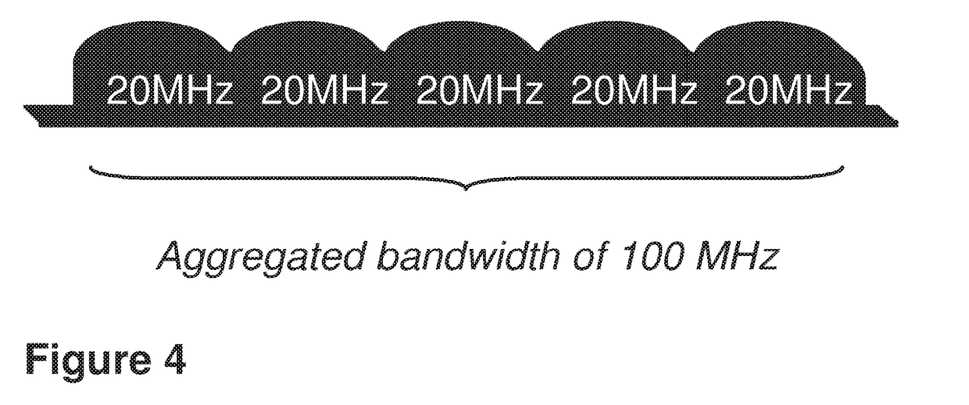
FIG. 4 is a schematic illustrating CA.

The LTE Release 10 standard may support bandwidths larger than 20 MegaHertz (MHz). One requirement on LTE Release 10 may be to assure backward compatibility with LTE Release 8. This may also include spectrum compatibility. That may imply that an LTE Release 10 carrier, wider than 20 MHz, may appear as a number of LTE carriers to an LTE Release 8 terminal. Each such carrier may be referred to as a Component Carrier (CC). In particular, for early LTE Release 10 deployments, it may be expected that there may be a smaller number of LTE Release 10-capable terminals compared to many LTE legacy terminals. Therefore, it may be necessary to assure an efficient use of a wide carrier also for legacy terminals, i.e., that it may be possible to implement carriers where legacy terminals may be scheduled in all parts of the wideband LTE Release 10 carrier. The straightforward way to obtain this may be by means of Carrier Aggregation (CA). CA implies that an LTE Release 10 terminal may receive multiple CC, where the CC may have, or at least the possibility to have, the same structure as a Release 8 carrier. CA is illustrated in the schematic diagram of FIG. 4, where 5 carriers of 20 MHz each are aggregated to form a bandwidth of 100 MHz. A CA-capable communication device, such as a UE, may be assigned a Primary Cell (PCell) which is always activated, and one or more Secondary Cells (SCells), which may be activated or deactivated dynamically.

The number of aggregated CC as well as the bandwidth of the individual CC may be different for UL and DL. A symmetric configuration refers to the case where the number of CCs in DL and UL is the same, whereas an asymmetric configuration refers to the case that the number of CCs is different. It may be noted that the number of CCs configured in a cell may be different from the number of CCs seen by a terminal: A terminal may for example support more DL CCs than UL CCs, even though the cell is configured with the same number of UL and DL CCs.

In addition, a feature of CA may be the ability to perform cross-carrier scheduling. This mechanism may allow an (E)PDCCH on one CC to schedule data transmissions on another CC by means of a 3-bit Carrier Indicator Field (CIF) inserted at the beginning of the (E)PDCCH messages. For data transmissions on a given CC, a UE may expect to receive scheduling messages on the (E)PDCCH on just one CC—either the same CC, or a different CC via cross-carrier scheduling; this mapping from (E)PDCCH to PDSCH may also be configured semi-statically.

LTE Measurements

A UE may perform periodic cell search and Reference Signal Received Power (RSRP) and Reference Signal Received Quality (RSRQ) measurements in Radio Resource Control (RRC) Connected mode. It may be responsible for detecting new neighbor cells, and for tracking and monitoring already detected cells. The detected cells and the associated measurement values may be reported to the network. Reports to the network may be configured to be periodic or aperiodic based a particular event.

Rel-12 LTE Discovery Reference Signal (DRS)

To share the channel in the unlicensed spectrum, the LAA SCell may not occupy the channel indefinitely. One of the mechanisms for interference avoidance and coordination among small cells may be the SCell ON/OFF feature, whereby when a small cell has no or low traffic, the small cell may be turned off or dynamically blanked to reduce the interference to neighboring cells. In Rel-12 LTE, discovery signals were introduced to provide enhanced support for SCell ON/OFF operations. A discovery signal may be understood as a set of reference signals and synchronization sequences that may be transmitted together in the same subframe in order to facilitate synchronization, Radio Resource Management (RRM) measurements, and channel estimation. Specifically, these signals may be introduced to handle a potentially severe interference situation, particularly on the synchronization signals, resulting from dense deployment, as well as to reduce UE inter-frequency measurement complexity.

Figure 5:
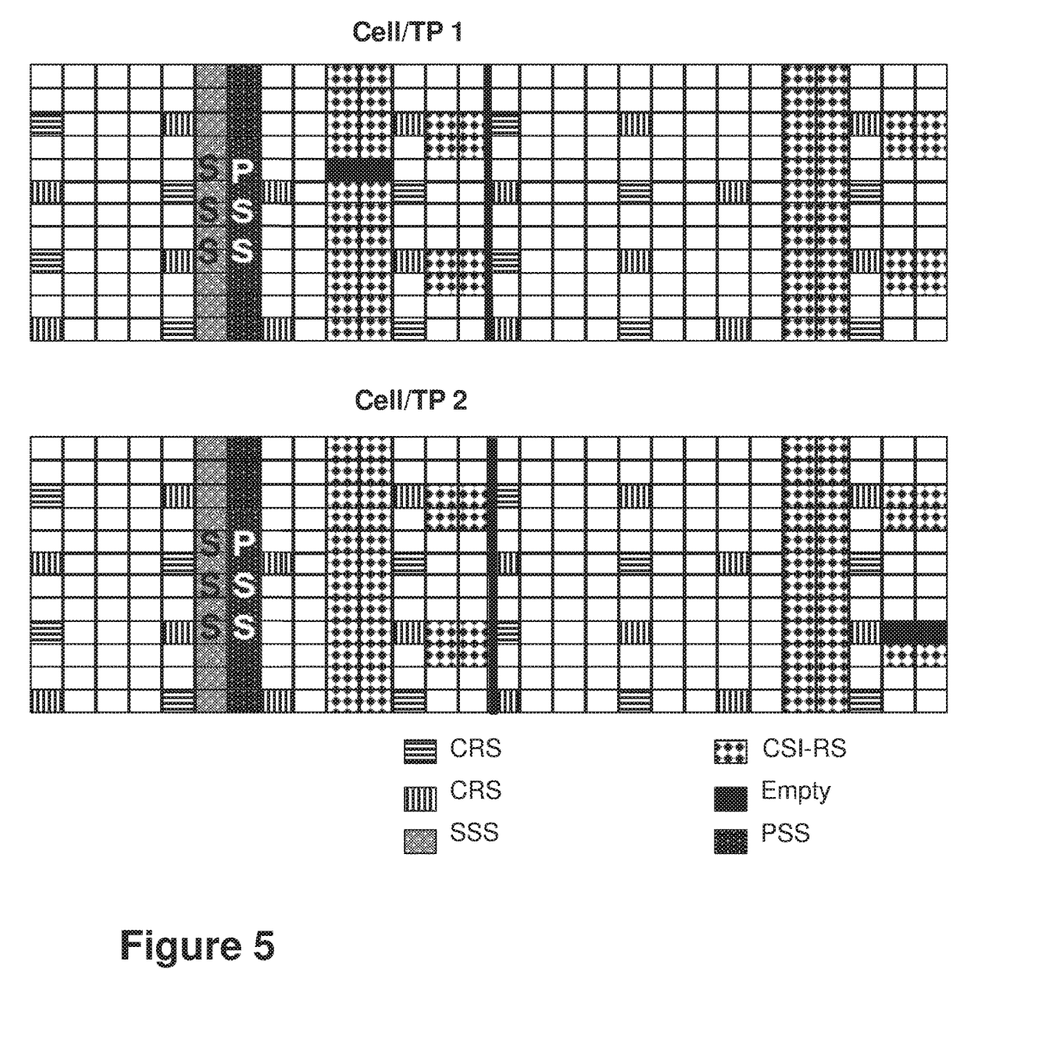
FIG. 5 is a schematic diagram of two subframes comprising DRS.

A so called DRS occasion may be understood herein as the time period wherein DRS are transmitted, e.g., from a cell. The discovery signals or Discovery Reference Signal (DRS) in a DRS occasion may be comprised of the Primary Synchronization Signal (PSS), Secondary Synchronization Signal (SSS), the CRS and when configured, the Channel State Information Reference Signals (CSI-RS). The PSS and SSS may be used for coarse synchronization, when needed, and for cell identification. The CRS may be used for fine time and frequency estimation and tracking and may also be used for cell validation, i.e., to confirm the cell IDentity (ID) detected from the PSS and SSS. The CSI-RS is another signal that may be used in dense deployments for cell or transmission point identification. FIG. 5 shows the presence of these signals in a DRS occasion of length equal to two subframes and also shows the transmission of the signals over two different cells or Transmission Points (TP).

FIG. 5 is a schematic diagram of the OFDM subcarriers and symbols in two subframes, wherein the dotted RE with light background represent SSS, the dotted RE with black background represent PSS, the striped RE represent CRS, the black RE represent empty RE, and the checkered RE represent CSI-RS. The two subframes are separated by a bold vertical bar.

The DRS occasion corresponding to transmissions from a particular cell may range in duration from one to five subframes for Frequency Division Duplex (FDD), and two to five subframes for Time Division Duplex (TDD). The subframe in which the SSS occurs may mark the starting subframe of the DRS occasion. This subframe is either subframe 0 or subframe 5 in both FDD and TDD. In TDD, the PSS may appear in subframe 1 and subframe 6, while in FDD the PSS may appear in the same subframe as the SSS. The CRS may be transmitted in all DL subframes and Downlink Pilot TimeSlot (DwPTS) regions of special subframes.

The discovery signals may be useable by the UE for performing cell identification, RSRP and RSRQ measurements. The RSRP measurement definition based on discovery signals may be the same as in prior releases of LTE.

In Rel-12, RSRP measurements based on the CRS and CSI-RS in the DRS occasions and RSRQ measurements based on the CRS in the DRS occasions have been defined. As stated earlier, discovery signals may be used in a small cell deployment where the cells are being turned off and on or in a general deployment where the on/off feature is not being used. For instance, discovery signals may be used to make RSRP measurements on different CSI-RS configurations in the DRS occasion being used within a cell, which may enable the detection of different transmission points in a shared cell.

The provision of DRS timing information may be done via a Discovery Measurement Timing Configuration (DMTC) that may be signaled to the UE. The DMTC may provide a window with a duration of 6 milliseconds (ms) occurring with a certain periodicity and timing within which the UE may expect to receive discovery signals. The duration of 6 ms may be the same as the measurement gap duration as defined currently in LTE and may allow the measurement procedures at the UE for discovery signals to be harmonized regardless of the need for measurement gaps. Only one DMTC may be provided per carrier frequency including the current serving frequencies. The UE may expect that the network will transmit discovery signals so that all cells that are intended to be discoverable on a carrier frequency transmit discovery signals within the DMTCs. Furthermore, when measurement gaps may be needed, it may be expected that the network may ensure sufficient overlap between the configured DMTCs and measurement gaps.

Wireless Local Area Network (WLAN)

Figure 6:
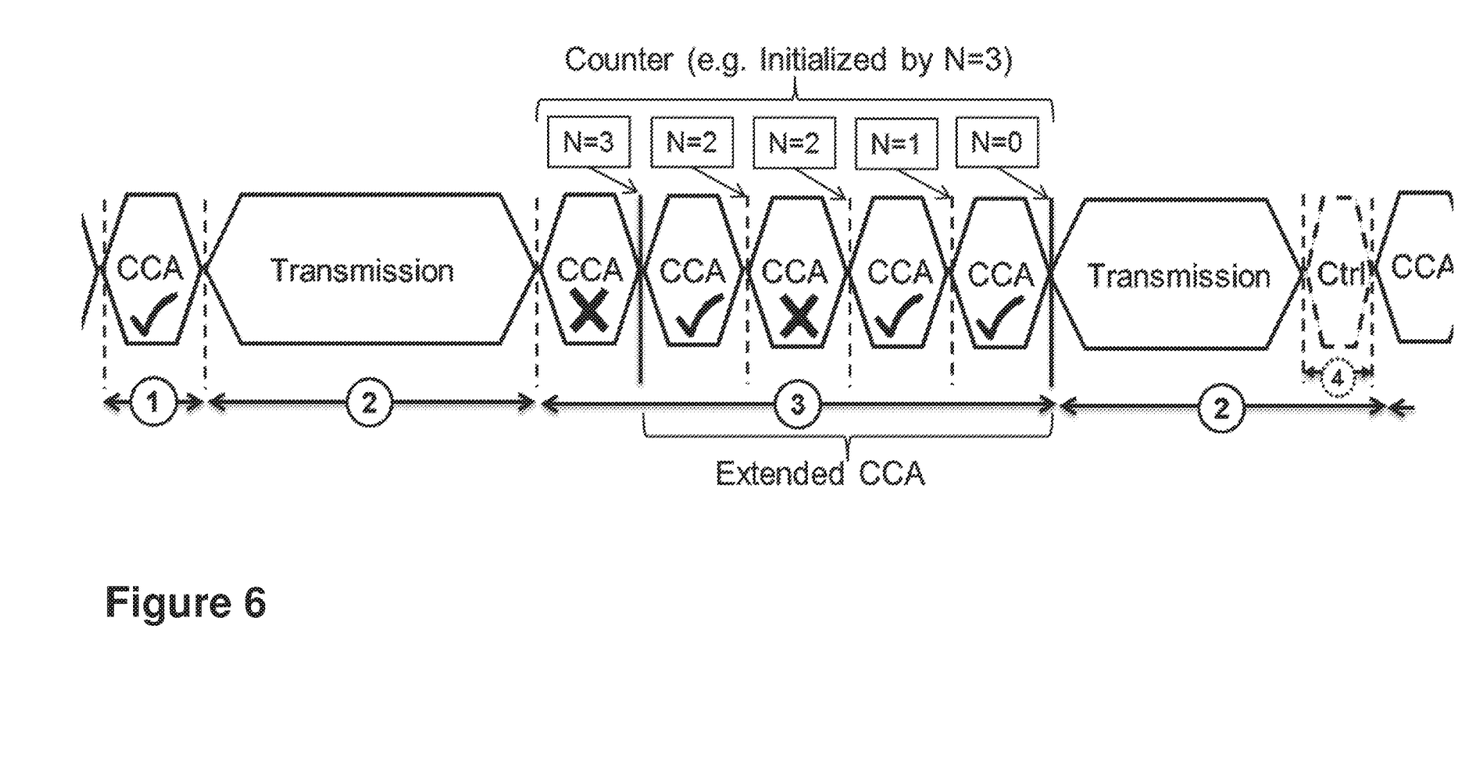
FIG. 6 is a schematic diagram illustrating an example of the LBT mechanism.

In typical deployments of WLAN, Carrier Sense Multiple Access with Collision Avoidance (CSMA/CA) may be used for medium access. This means that the channel may be sensed to perform a Clear Channel Assessment (CCA), and a transmission may be initiated only if the channel is declared as Idle. In case the channel is declared as Busy, the transmission may be essentially deferred until the channel is deemed to be Idle. When the range of several Access Points (APs) using the same frequency overlap, this may mean that all transmissions related to one AP may be deferred in case a transmission on the same frequency to or from another AP, which is within range, may be detected. Effectively, this may mean that if several APs are within range, they may have to share the channel in time, and the throughput for the individual APs may be severely degraded. A general illustration on an example of the Listen Before Talk (LBT) mechanism or process is shown in FIG. 6. The LBT procedure may either be frame-based or load-based. The frame based LBT framework may allow an equipment to perform a CCA per fixed frame period for a duration of T1, as illustrated in FIG. 6 by a circled 1. CCA may be performed using Energy detection. If the channel is found to be available after the CCA operation, as indicated by a check sign in the Figure, the equipment may transmit immediately up to the maximum allowed channel occupancy time, for example 10 ms, where this time may be referred to as the channel occupancy time, T2, and denoted by circled 2 in FIG. 6. In the example of FIG. 6, a communication device may perform an extended CCA under the load-based LBT framework, as described for example in Europe regulation EN 301.893 v 1.7.1, load-based LBT procedure. The extended CCA under the load-based LBT framework may also be referred to herein as a complete random backoff procedure, and is indicated in the Figure with a circled 3.

Basically, a complete random backoff procedure may be understood as involving drawing a random number prior to transmission, and determining that the channel has been idle for said number of observation slots, i.e., CCA, before commencing transmission. The range from which the random number is drawn may be modified, depending on whether previous transmissions were successful or unsuccessful. During the random backoff procedure, before the equipment transmits for the first time on an operating channel, the equipment may check if the channel is currently idle. At the end of the required idle period, the equipment may resume CCA for channel access. If the channel is not idle, the equipment draws a random number N of CCAs after which the channel has to be available before transmission may occur. N, in FIG. 6 is 3. A counter may be set to 3, as indicated in FIG. 6, and 1 is subtracted from the current N value, every time the channel is observed to be available after a CCA. If the channel is found to be busy after the CCA operation, as indicated by a cross sign, no value is subtracted, or a 0 value is subtracted. When N is counted down to 0, transmission may take place during the second period indicated by "Transmission" in FIG. 6, starting from the left end of the Figure. During the second period indicated by the circled number 2 in FIG. 6, starting from the left end of the Figure, data may be transmitted and control signals may be sent without a CCA check during the period denoted as "Ctrl" by a circled 4.

In contrast to a complete random backoff procedure, a short CCA may be understood as observing the channel for a fixed, short number of CCA slots, such as one slot, without drawing a random number, as described above.

In LAA, described below, DRS that may be transmitted without PDSCH in the same subframe/s may be sent after a short Clear Channel Assessment (CCA), based on a single sensing interval. In other words, a complete random backoff procedure may not be required to be followed when sending DRS without PDSCH.

Licensed-Assisted Access (LAA) to Unlicensed Spectrum Using LTE

Up to now, the spectrum used by LTE may be dedicated to LTE. This may have the advantage that the LTE system may not need to care about the coexistence issue and the spectrum efficiency may be maximized. However, the spectrum allocated to LTE is limited, which may not meet the ever increasing demand for larger throughput from applications and/or services. Therefore, a new study item has been initiated in 3GPP on extending LTE to exploit unlicensed spectrum in addition to licensed spectrum. Unlicensed spectrum may, by definition, be simultaneously used by multiple different technologies. Therefore, LTE may need to consider the coexistence issue with other systems such as IEEE 802.11 (Wi-Fi). Operating LTE in the same manner in unlicensed spectrum as in licensed spectrum may seriously degrade the performance of Wi-Fi, as Wi-Fi may not transmit once it detects the channel is occupied.

Figure 7:
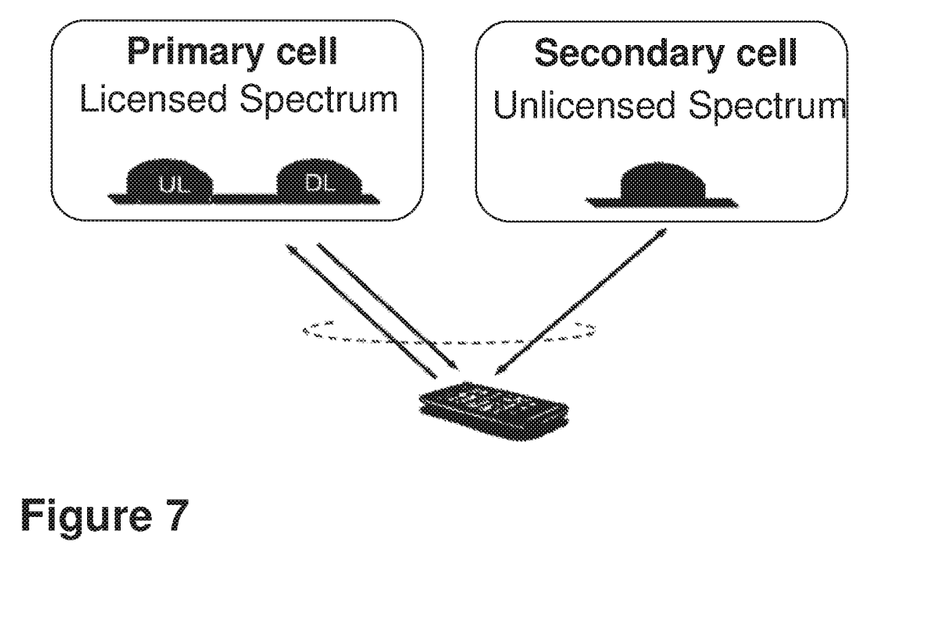
FIG. 7 is a schematic diagram illustrating LAA to unlicensed spectrum using LTE carrier aggregation.

Furthermore, one way to utilize the unlicensed spectrum reliably may be to transmit essential control signals and channels on a licensed carrier. That is, as shown in FIG. 7, a UE may be connected to a PCell in the licensed band and one or more SCells in the unlicensed band. Herein, a SCell in unlicensed spectrum may be referred to as a License-Assisted Secondary Cell (LA SCell) or Licensed-Assisted Access Cell. FIG. 7 illustrates LAA to unlicensed spectrum using LTE carrier aggregation.

Further detailed information on some aspects discussed herein may be found in: 3GPP TS 36.211, V11.4.0 (2013-09), 3rd Generation Partnership Project; Technical Specification Group Radio Access Network; Evolved Universal Terrestrial Radio Access (E-UTRA); Physical Channels and Modulation, Release 11, in 3GPP TS 36.213, V11.4.0 (2013-09), 3rd Generation Partnership Project; Technical Specification Group Radio Access Network; Evolved Universal Terrestrial Radio Access (E-UTRA); Physical layer procedures, Release 11, and 3GPP TS 36.331, V11.5.0 (2013-09), 3rd Generation Partnership Project; Technical Specification Group Radio Access Network; Evolved Universal Terrestrial Radio Access (E-UTRA); Radio Resource Control (RRC), Release 11.

In existing LTE communication methods, a significant delay in accessing the medium may be incurred when networks are congested with multiple nodes contending for channel access.

SUMMARY

It is an object of embodiments herein to improve transmission of control information in wireless communications networks.

According to a first aspect of embodiments herein, the object is achieved by a method performed by a first communication device. The method is for sending one or more control signals to a second communication device. The first communication device and the second communication device operate in a wireless communications network. The first communication device determines, during a first period, that a transmission medium is available for sending the one or more control signals to the second communication device. The first communication device then sends, to the second communication device, the one or more control signals along with a discovery signal, via the transmission medium. The discovery signal and the one or more control signals are sent without data after the first period. The first period is shorter than a second period for determining that the transmission medium is available for sending the data.

According to a second aspect of embodiments herein, the object is achieved by the first communication device configured to send one or more control signals to the second communication device. The first communication device and the second communication device are configured to operate in the wireless communications network. The first communication device is configured to determine, during the first period, that the transmission medium is available for sending the one or more control signals to the second communication device. The first communication device is further configured to send, to the second communication device, the one or more control signals along with the discovery signal, via the transmission medium. The discovery signal and the one or more control signals are configured to be sent without data after the first period. The first period is shorter than the second period configured for determining that the transmission medium is available for sending the data.

According to a third aspect of embodiments herein, the object is achieved by a computer program. The computer program comprises instructions which, when executed on at least one processor, cause the at least one processor to carry out the method according to embodiments herein.

According to a fourth aspect of embodiments herein, the object is achieved by computer-readable storage medium. The computer-readable storage medium has stored thereon a computer program comprising instructions which, when executed on at least one processor, cause the at least one processor to carry out the method according to embodiments herein.

By the first communication device determining that the transmission medium is available during the first period, and then sending the one or more control signals along with the discovery signal to the second communication device, after the first period, the first communication device may send the one or more control signals faster, that is, with less delay, than with existing methods. This is because the first period is shorter than the second period for determining that the transmission medium is available for sending the data, since control signals are according to existing methods sent along with data, e.g., in unlicensed spectrum. In a particular example, the first communication device may send the one or more control signals, without the need to complete a random backoff procedure. Therefore, fast control signaling may be achieved and UL channel starvation may be mitigated in congested network scenarios since a separate period for determining that the transmission medium is available is not needed for the first communication device to send UL e.g., transmission grants, improving the overall function of the wireless communications network.

BRIEF DESCRIPTION OF THE DRAWINGS

Examples of embodiments herein are described in more detail with reference to the accompanying drawings, the content of which is briefly summarized in the following list.

DETAILED DESCRIPTION

Terminologies

The following commonly terminologies are used in the embodiments and are elaborated below:

Radio network node: In some embodiments the non-limiting term radio network node is more commonly used and it refers to any type of network node serving UE and/or connected to other network node or network element or any radio node from where a UE may receive a signal. Examples of radio network nodes are Node B, Base Station (BS), Multi-Standard Radio (MSR) radio node such as MSR BS, eNode B, network controller, Radio Network Controller (RNC), base station controller, relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS) etc.

Network node: In some embodiments a more general term "network node" is used and it may correspond to any type of radio network node or any network node, which communicates with at least a radio network node. Examples of network node are any radio network node stated above, core network node, e.g., Mobile Switching Centre (MSC), Mobility Management Entity (MME), etc., Operation and Maintenance (O&M), Operating Support Systems (OSS), Self-Organizing Network (SON), positioning node, e.g., Evolved Serving Mobile Location Center (E-SMLC), Minimization of Drive Test (MDT), etc.

User equipment: In some embodiments the non-limiting term user equipment (UE) is used and it refers to any type of wireless device communicating with a radio network node in a cellular or mobile communication system. Examples of UE are target device, device to device UE, machine type UE or UE capable of machine to machine communication, Personal Digital Assistant (PDA), iPAD, Tablet, mobile terminals, smart phone, Laptop Embedded Equipped (LEE), Laptop Mounted Equipment (LME), USB dongles etc.

The embodiments herein also apply to the multi-point carrier aggregation systems.

As part of the development of embodiments herein, a problem with exiting methods will first be identified and discussed.

Currently, control information such as resource allocation grants, sent via PDCCH/EPDCCH on unlicensed carriers may be transmitted only after a complete random backoff procedure is performed and, when data, e.g., the PDSCH, is also present. A significant delay in accessing the medium may therefore be incurred when networks are congested with multiple nodes contending for channel access.

In order to expedite the transmission of control signals, embodiments herein may relate to transmission of control signals along with discovery reference signals. Particular examples herein may teach how to exploit the short CCA for quick DRS channel access without PDSCH by sending control information such as resource allocation grants along with the DRS. The grants may be for UL transmission, DL transmissions in future subframes, cross-carrier grants or joint grants across multiple carriers, and common search space control signaling.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from 3GPP LTE has been used in this disclosure to exemplify the embodiments herein, this should not be seen as limiting the scope of the embodiments herein to only the aforementioned system. Other wireless systems with similar requirements to those of LTE for LAA or standalone LTE-U, may also benefit from exploiting the ideas covered within this disclosure.

Figure 8:
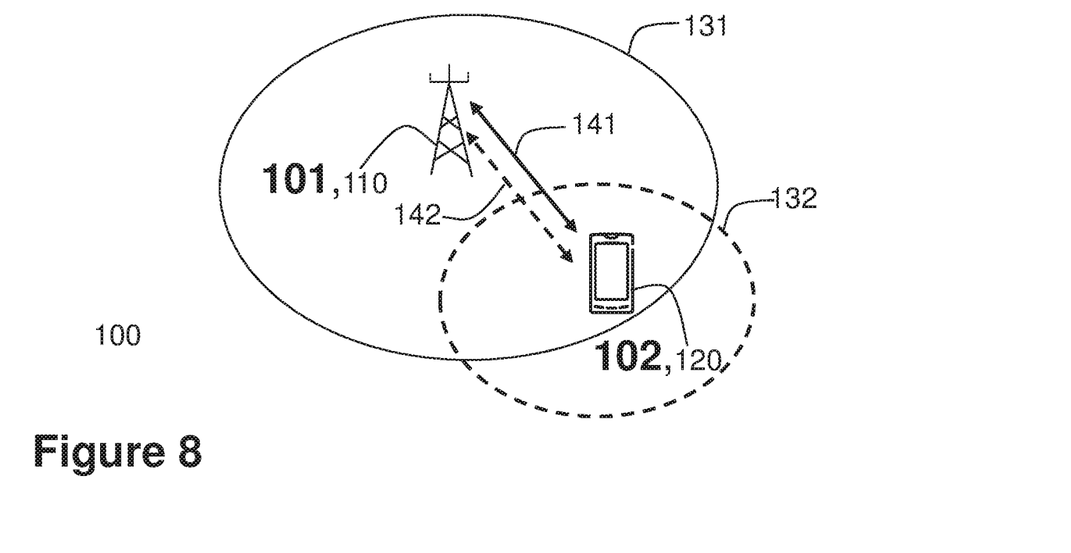
FIG. 8 is a schematic diagram illustrating embodiments of a wireless communications network, according to embodiments herein.

FIG. 8 depicts an example of a wireless communications network 100, sometimes also referred to as a cellular radio system, cellular network or wireless communications system, in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), 5G system or any cellular network or system with similar requirements to those of LTE for LAA or standalone LTE in Unlicensed (LTE-U). Thus, although terminology from 3GPP LTE may be used in this disclosure to exemplify embodiments herein, this should not be seen as limiting the scope of the embodiments herein to only the aforementioned system.

The wireless communications network 100 comprises a plurality of communication devices, such as the first communication device 101, and the second communication device 102. Any of the first communication device 101 and the second communication device 102 may be a network node such as network node 110 described below, or a wireless device such as wireless device 120 described below. The first communication device 101 is different than the second communication device 102. Typically, on the DL, the first communication device 101 will be the network node 110 and the second communication device 102 will be the wireless device 120. This corresponds to the non-limiting particular example illustrated in FIG. 8. Also, typically, on the UL, the first communication device 101 will be the wireless device 120 and the second communication device 102 will be the network node 110. In Device to Device (D2D) communications, both of the first communication device 101 and the second communication device 102 may be different wireless devices, both in the UL and in the DL.

The wireless communications network 100 comprises a plurality of network nodes whereof the network node 110 is depicted in FIG. 8. The network node 110 may be a transmission point such as a radio base station, for example an eNB, an eNodeB, or a Home Node B, a Home eNode B or any other network node capable to serve a wireless device, such as a user equipment or a machine type communication device in the wireless communications network 100.

The wireless communications network 100 covers a geographical area which, which in some embodiments may be divided into cell areas, wherein each cell area is served by a network node, although, one network node may serve one or several cells. In the non-limiting example depicted in FIG. 8, the network node 110 serves a first cell 131, which may be a primary cell. The primary cell 131 is typically in licensed spectrum. In FIG. 8, the network node 110 also serves a second cell 132, which may be a licensed-assisted access cell, also referred to herein as licensed-assisted access secondary cell 132, as defined above. The licensed-assisted access cell 132 is in unlicensed spectrum. Since the primary cell 131 and the licensed-assisted access cell 132 are used for communication between the first communication device 101 and the second communication device 102, the primary cell 131 and the licensed-assisted access cell 132 may be understood as being associated with the first communication device 101 and the second communication device 102. The network node 100 may be of different classes, such as, e.g., macro eNodeB, home eNodeB or pico base station, based on transmission power and thereby also cell size. Typically, the wireless communications network 100 may comprise more cells similar to the first cell 131 and the second cell 132, served by their respective network node. This is not depicted in FIG. 8 for the sake of simplicity. In other examples than those depicted in FIG. 8, wherein the wireless communications network 100 is a non-cellular system, any of the network node 110 may serve receiving nodes with serving beams. The network node 110 may support one or several communication technologies, and its name may depend on the technology and terminology used. In 3GPP LTE, the network node 110, which may be referred to as eNodeB or even eNB, may be directly connected to one or more core networks.

A wireless device 120 also referred to herein as a user equipment or UE is located in the wireless communication network 100. The wireless device 120 may e.g. a wireless communication device such as a UE which is also known as e.g. mobile terminal, wireless terminal and/or mobile station, a mobile telephone, cellular telephone, or laptop with wireless capability, just to mention some further examples. The wireless device 120 may be, for example, portable, pocket-storable, hand-held, computer-comprised, or a vehicle-mounted mobile device, enabled to communicate voice and/or data, via the RAN, with another entity, such as a server, a laptop, a PDA, or a tablet computer, sometimes referred to as a tablet with wireless capability, Machine-to-Machine (M2M) device, device equipped with a wireless interface, such as a printer or a file storage device, modem, or any other radio network unit capable of communicating over a wired or radio link in a communications system. The wireless device 120 is enabled to communicate wirelessly in the wireless communications network 100. The communication may be performed e.g., via a RAN and possibly one or more core networks, comprised within the wireless communications network 100.

The first communication device 101 is configured to communicate within the wireless communications network 100 with the second communication device 102 over a first radio link 141 in the first cell 131, and over a second radio link 142 in the second cell 132.

Several embodiments are comprised herein. More specifically, the following are embodiments related to the first communication device 101.

Figure 9:
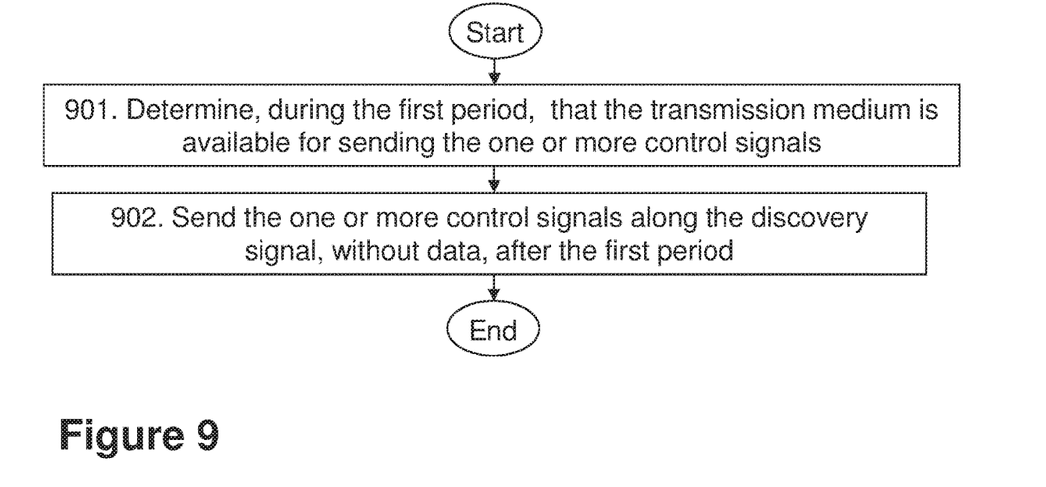
FIG. 9 is a flowchart depicting embodiments of a method in a first communication device, according to embodiments herein.

Embodiments of a method performed by the first communication device 101 for sending one or more control signals to the second communication device 102, will now be described with reference to the flowchart depicted in FIG. 9. The first communication device 101 and the second communication device 102 operate in the wireless communications network 100.

Components from one embodiment may be tacitly assumed to be present in another embodiment and it will be obvious to a person skilled in the art how those components may be used in the other exemplary embodiments.

Action 901

During the course of communications between the first communication device 101 and the second communication device 102, the first communication device 101 may need to send one or more control signals to the second communication device 102. A control signal may be understood as a set of e.g., coded bits that carry scheduling information for downlink or uplink data transmissions. The one or more control signals may comprise, for example, one or more of: an uplink grant, a downlink grant, a cross carrier grant, a joint grant, and common search space control signalling. The sending of the one or more control signals may occur via a transmission medium, which may be a carrier on unlicensed spectrum.

In order to send the one or more control signals to the second communication device 102, in this Action, the first communication device 101 first determines, during a first period, that the transmission medium is available for sending the one or more control signals to the second communication device 102. Sending may be understood as transmitting. The determining that the transmission medium is available in this Action may be understood, for example, as determining that the transmission medium is idle. That is, that other communication devices are not transmitting in the transmission medium during the first period. In some particular examples, the determining Action 901 may comprise performing a short CCA procedure, e.g., a single sensing interval, as configured, and determining that the transmission medium, e.g., a transmission channel, is idle. In other embodiments, the determining in this Action 901 may be performed without having to sense for 1 CCA slot.

The first period may be understood as a time period that has a first duration. The first period may be, for example, a short CCA. As a non-limiting example, the short CCA may be of the duration of a CCA sensing slot used in the random backoff procedure, e.g., 9 μs. As another example, the short CCA may be of the duration of a defer period used in the random backoff procedure, e.g., the Arbitration Inter-Frame Space (AIFS), Distributed Coordination Function Inter-Frame Space (DIFS), or Point Coordination Function Inter-Frame Space (PIFS), as described in e.g., IEEE Std 802.11™-2012.

In some embodiments, the carrier may be a secondary carrier. For example, the carrier may be a secondary carrier configured as a serving cell on unlicensed spectrum, such as the second cell 132. The carrier may be aggregated with a primary carrier configured as another serving cell on a licensed or unlicensed channel, such as the first cell 131.

Action 902

Once the first communication device 101 has determined that the transmission medium is available, in this Action, the first communication device 101 sends, e.g., transmits, to the second communication device 102, the one or more control signals along with a discovery signal, via the transmission medium, e.g., via the second radio link 142. The discovery signal and the one or more control signals are sent without data after the first period. The first period is shorter than a second period for determining that the transmission medium is available for sending the data.

The second period may be understood as another time period that has a second duration. The duration of the first time period may be a fraction of the duration of the second time period. In some examples, the first period may be a time period to perform a short CCA and the second period may be, for example, a complete random backoff procedure, e.g., such as in LTE. The complete random backoff procedure may have a variable duration from procedure to procedure, but overall, according to embodiments herein the one or more control signals may be sent after e.g. a few microseconds, as opposed to after e.g., tens or hundreds of microseconds.

The data may be, for example, a data channel such as the PDSCH. The one or more control signals sent may be sent in downlink in one of: a PDCCH, and an EPDCCH. The discovery signal may be, for example, a DRS in LTE.

In some embodiments, the sending the one or more control signals along with the discovery signal may comprise sending the one or signals within a DRS occasion comprising the discovery signal.

The sending the one or more control signals along with the discovery signal may be understood as sending the one or more control signals in a same set of time-frequency resources as the discovery signal, which may be referred to herein as a first set of time-frequency resources. An example of the first set of time-frequency resources may be one or more subframes, e.g., in LTE, which may be referred to herein as a first one or more subframes. That is, in some examples, the sending the one or more control signals along with the discovery signal may comprise sending the one or more signals in the same subframe wherein the discovery signal is sent. The DRS transmission burst within a DRS occasion may span a variable number of subframes, including partial subframes. In particular, the sending the one or more control signals along with the discovery signal may comprise sending the one or more signals within one or more subframes within a DRS occasion comprising the discovery signal. Therefore, the sending the one or more control signals along with the discovery signal may comprise sending the one or more signals in the same one or more subframes wherein the discovery signal is sent. For example, the (E)PDCCHs for one or more UEs may be sent in the same subframe/s that contain the DRS. In further particular examples, the (E)PDCCH may be transmitted in the PDSCH region, e.g., from OFDM symbol #3 onwards as an example. The PDCCH may be sent in the first 3 OFDM symbols, e.g., in the "control region" in FIG. 3.

The DRS with resource grants may be sent periodically or aperiodically.

In some embodiments, the data may be sent by the first communication device 101 to the second communication device 102 after the second period in a second set of time-frequency resources, e.g., a second one or more subframes in LTE.

The following is a description of different groups of examples of embodiments herein, which are illustrated taking DRS as an example of the discovery signal.

DRS with UL Grants

In a first group of examples, UL resource grants may be sent by the first communication device 101 in the subframe/s containing DRS within a DRS occasion. These grants may be used to indicate PUSCH allocations on an upcoming Transmission-Time Interval (TTI), for example 2 ms or 4 ms after the DRS subframe. Grants for multiple upcoming TTIs may be sent in the same subframe.

In another exemplary implementation, the UL grant/s sent with the DRS may be multi-subframe grants that may be valid for a specific range of multiple UL subframes, or that may be valid for a specific time window on the UL.

DRS with DL Grants

In a second group of examples, the resource grants sent by the first communication device 101 with the DRS may correspond to DL PDSCH grants for future subframes or upcoming burst of subframes.

DRS with Cross-Carrier or Joint Grants

In a third group of examples, cross-carrier scheduling grants for DL or UL transmission on another carrier may be sent by the first communication device 101 along with the DRS on the scheduling SCell, such as the second cell 132. In a multi-carrier scenario, the first communication device 101, e.g., an eNB, may transmit DRS with control signals and no PDSCH on one or more unlicensed carriers while sending PDSCH with full random backoff on other unlicensed carriers.

In another exemplary implementation, the scheduling grant that may be sent by the first communication device 101 with DRS on the scheduling cell may be a joint grant which is valid across multiple carriers in the same TTI, or burst of TTIs.

The first, second and third group of examples may be combined. For the multi-subframe UL scheduling and the DL scheduling for future frames, the DCI may need a new field which specifies the number of subframes for which the resource allocation indicated by the DCI may be valid.

DRS with Common Search Space Control Signaling

In a fourth group of examples, control signals associated with the (E)PDCCH common search space of UEs, that is, the region of the DL subframe wherein all UEs may check for control signals, such as system information or transmit power control commands for example, may be sent by the first communication device 101 in DRS subframe/s without PDSCH in the DRS occasion with the DRS being transmitted either with no CCA or with a short CCA.

Figure 10:
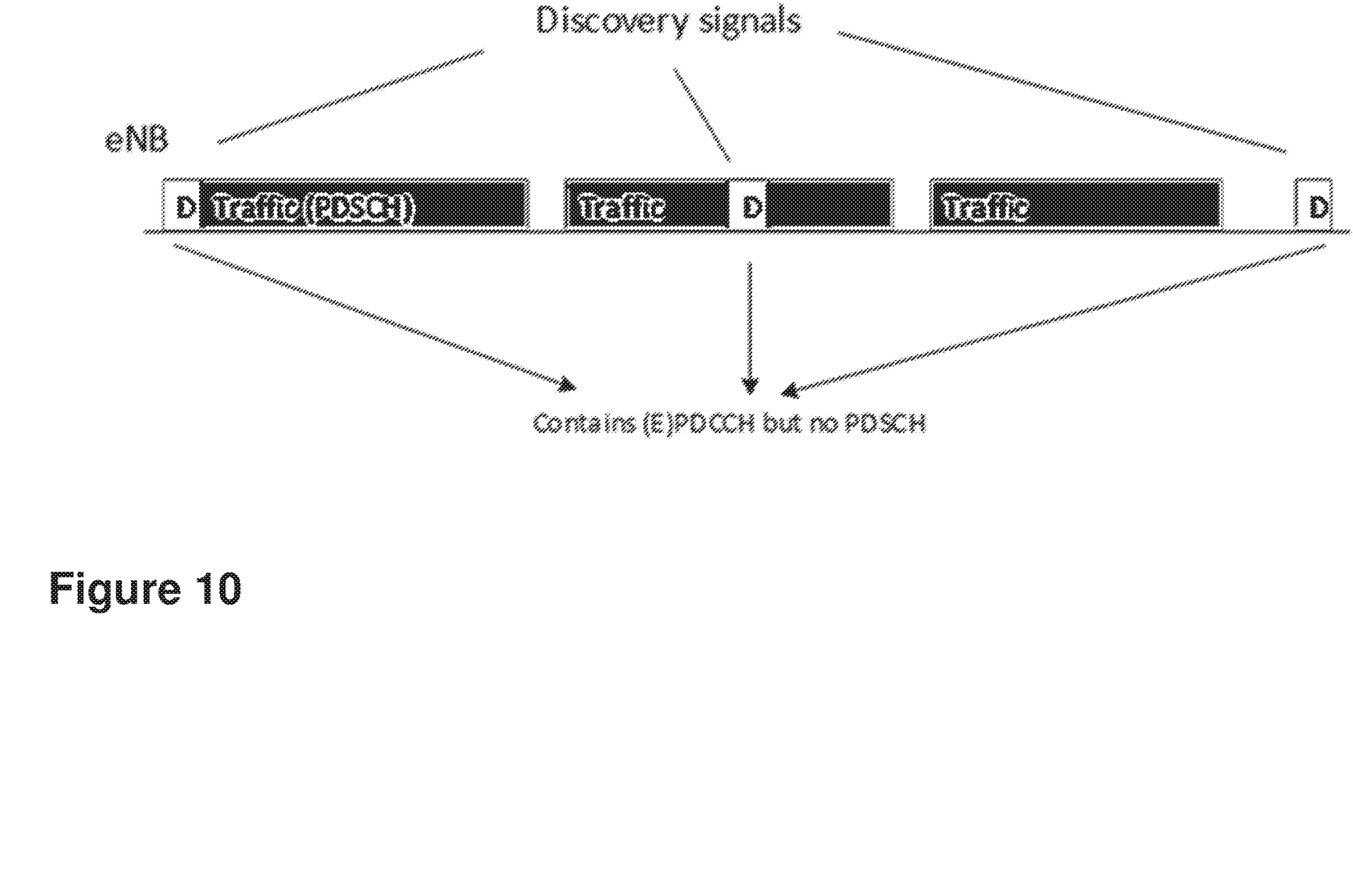
FIG. 10 is a schematic diagram illustrating an example of embodiments of a method in a first communication device, according to embodiments herein.

A principle of embodiments herein, may be understood as relating to sending one or more control signals, such as resource allocation grants and other control signals, in DRS without PDSCH so as to use a short CCA prior to channel access. This is illustrated in the example of FIG. 10. FIG. 10 is a schematic diagram, wherein the black blocks represent data transmissions comprising PDSCH outside of the DRS occasions. The DRS occasions comprising the discovery signals and the one or more control signals are represented by the white blocks comprising the letter "D". FIG. 10 illustrates fast control signaling sent along with DRS without PDSCH, where (E)PDCCH is sent in the DRS subframe/s by the first communication device 101, an eNB in the non-limiting example of FIG. 10. The allocation grants or control signals may also be sent by the first communication device 101 using PDCCH.

Embodiments herein may be understood as teaching how to exploit the short CCA for quick DRS channel access without PDSCH by the first communication device 101 sending resource allocation grants along with the DRS. The grants may be for UL transmission, DL transmissions in future subframes, cross-carrier grants or joint grants across multiple carrier, and common search space control signaling.

Accordingly, an advantage of embodiments herein is therefore that fast control signaling may be achieved for LAA and/or standalone LTE-U.

Another advantage of embodiments herein is that UL channel starvation may be mitigated in congested network scenarios.

To perform the method actions described above in relation to FIGS. 9 and/or 10, the first communication device 101 is configured to send the one or more control signals to the second communication device 102. The first communication device 101 may comprise the following arrangement depicted in FIG. 11. As already mentioned, the first communication device 101 and the second communication device 102 are further configured to operate in the wireless communications network 100.

The detailed description of some of the following corresponds to the same references provided above, in relation to the actions described for the first communication device 101, and will thus not be repeated here. For example, the one or more control signals may comprise one or more of: an uplink grant, a downlink grant, a cross carrier grant, a joint grant, and common search space control signalling.

Figure 11:
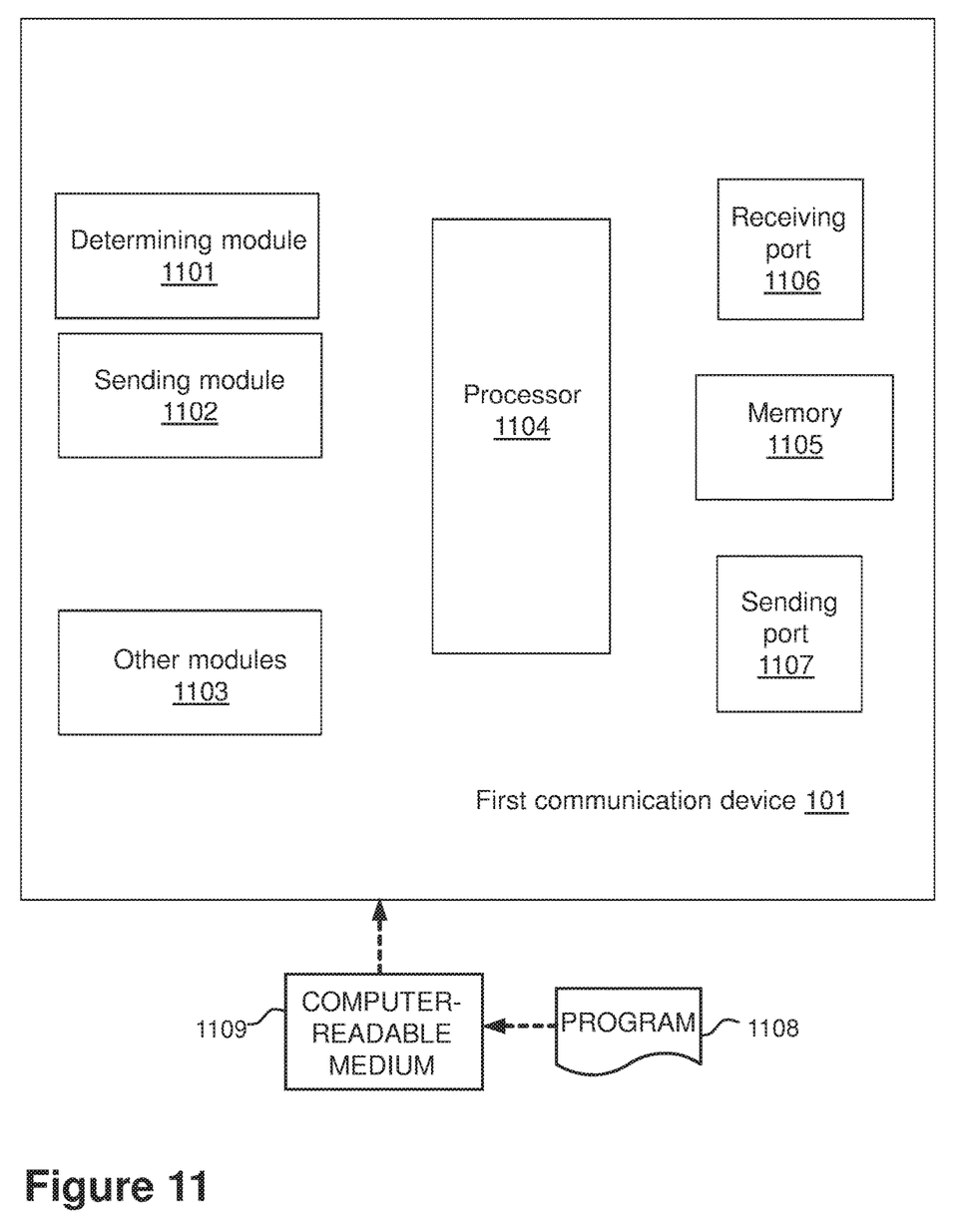
FIG. 11 is a schematic block diagram illustrating embodiments of a first communication device, according to embodiments herein.

The first communication device 101 is configured to, e.g., by means of a determining module 1101 configured to, determine, during the first period, that the transmission medium is available for sending the one or more control signals to the second communication device 102.

The determining module 1101 may be a processor 1104 of the first communication device 101, or an application running on such processor.

In some embodiments, the transmission medium may be a carrier on unlicensed spectrum. The carrier may be a secondary carrier.

The first communication device 101 is further configured to, e.g., by means of a sending module 1102 configured to, send, to the second communication device 102, the one or more control signals along with the discovery signal, via the transmission medium, the discovery signal and the one or more control signals being configured to be sent without data after the first period, the first period being shorter than a second period configured for determining that the transmission medium is available for sending the data.

The sending module 1102 may be the processor 1104 of the first communication device 101, or an application running on such processor.

The first period may be a short CCA, and the second period may be a complete random backoff procedure.

The one or more control signals sent may be sent in downlink in one of: a PDCCH, and an EPDCCH.

The discovery signal may be a DRS in LTE.

The data may be a PDSCH.

In some embodiments, to send the one or more control signals along with the discovery signal may comprise to send the one or more signals within a DRS occasion comprising the discovery signal.

To send the one or more control signals along with the discovery signal may comprise to send the one or more signals in the same subframe wherein the discovery signal is configured to be sent.

The first communication device 101 may comprise other modules 1103.

The first communication device 101 may comprise an interface unit to facilitate communications between the first communication device 101 and other nodes or devices, e.g., the second communication device 102. The interface may, for example, include a transceiver configured to transmit and receive radio signals over an air interface in accordance with a suitable standard.

The embodiments herein may be implemented through one or more processors, such as the processor 1104 in the first communication device 101 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the first communication device 101. One such carrier may be in the form of a CD ROM disc. It is however feasible with other data carriers such as a memory stick. The computer program code may furthermore be provided as pure program code on a server and downloaded to the first communication device 101. The computer program code may also be provided as a service from the cloud.

The first communication device 101 may further comprise a memory 1105 comprising one or more memory units. The memory 1105 is arranged to be used to store obtained information, store data, configurations, schedulings, and applications etc. to perform the methods herein when being executed in the first communication device 101.

In some embodiments, the first communication device 101 may receive information from the second communication device 102, through a receiving port 1106. In some embodiments, the receiving port 1106 may be, for example, connected to one or more antennas in first communication device 101. In other embodiments, the first communication device 101 may receive information from another structure in the wireless communications network 100 through the receiving port 1106. Since the receiving port 1106 may be in communication with the processor 1104, the receiving port 1106 may then send the received information to the processor 1104. The receiving port 1106 may also be configured to receive other information.

The processor 1104 in the first communication device 101 may be further configured to transmit or send information to e.g., the second communication device 102, through a sending port 1107, which may be in communication with the processor 1104, and the memory 1105.

The first communication device 101 may comprise an interface unit to facilitate communications between the first communication device 101 and other nodes or devices, e.g., the second communication device 102. The interface may, for example, include a transceiver configured to transmit and receive radio signals over an air interface in accordance with a suitable standard.

Those skilled in the art will also appreciate that the determining module 1101, the sending module 1102 and the other modules 1103 described above may refer to a combination of analog and digital modules, and/or one or more processors configured with software and/or firmware, e.g., stored in the memory 1105, that, when executed by the one or more processors such as the processor 1104, perform the methods as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1101-1103 described above may be implemented as one or more applications running on one or more processors such as the processor 1104.

Thus, the methods according to the embodiments described herein for the first communication device 101 may be respectively implemented by means of a computer program 1108 product, comprising instructions, i.e., software code portions, which, when executed on at least one processor 1104, cause the at least one processor 1104 to carry out the actions described herein, as performed by the first communication device 101. The computer program 1108 product may be stored on a computer-readable storage medium 1109. The computer-readable storage medium 1109, having stored thereon the computer program 1108, may comprise instructions which, when executed on at least one processor 1104, cause the at least one processor 1104 to carry out the actions described herein, as performed by the first communication device 101. In some embodiments, the computer-readable storage medium 1109 may be a non-transitory computer-readable storage medium 1109, such as a CD ROM disc, or a memory stick. In other embodiments, the computer program 1108 product may be stored on a carrier containing the computer program just described, wherein the carrier is one of an electronic signal, optical signal, radio signal, or the computer-readable storage medium, as described above.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but the embodiments herein are equally applicable in the uplink for equivalent functions. For example, for the uplink, the first communication device 101 may send a newly-designed PUCCH together with a DeModulation Reference Signal (DMRS) or a Sounding Reference Signal (SRS), where the PUCCH may carry some information about its upcoming contention-based PUSCH transmissions. In such UL scenarios, it may be noted that the UL RS may be referred to with a different name than as a discovery signal.

What is claimed is:

1. A method of operation by a radio network node in a wireless communication network, the method comprising:
    transmitting control signaling on a downlink carrier during a Discovery Reference Signal (DRS) occasion, conditioned on first performing a Clear Channel Assessment (CCA) procedure to assess availability of a frequency channel occupied by the downlink carrier; and
    performing the CCA procedure as an extended CCA, if the DRS occasion includes a transmission of data by the radio network node, and otherwise performing the CCA procedure as a short CCA that is shorter in duration than the extended CCA;
    wherein the control signaling targets one or more wireless devices served by the radio network node, and, when the DRS occasion includes the transmission of the data, the data targets the one or more wireless devices served by the radio network node.

2. The method of claim 1, wherein a timing structure used by the radio network node for transmitting on the downlink carrier comprises recurring frames, with each frame comprising a plurality of subframes, and wherein the DRS occasion spans one or more subframes.

3. The method of claim 1, wherein transmitting the control signaling comprises transmitting the control signaling along with one or more DRS-related signals associated with the DRS occasion.

4. The method of claim 1, wherein the control signaling comprises one or more of: an uplink grant, a downlink grant, a cross carrier grant, a joint grant, and common search-space control signaling.

5. The method of claim 1, wherein the extended CCA comprises a Listen-Before-Talk (LBT) procedure that includes a random back-off procedure defining a deferment period and a CCA sensing slot, for use as needed in reassessing channel availability, and wherein the short CCA has a duration corresponding to the deferment period or the CCA sensing slot.

6. The method of claim 1, wherein the frequency channel resides in unlicensed radio spectrum and the CCA procedure facilitates coexistence between the radio network node and any other nodes or devices that operate in the unlicensed radio spectrum independent of the wireless communications network.

7. The method of claim 1, wherein the frequency channel resides in unlicensed radio spectrum and the downlink carrier is a secondary carrier synchronized with a primary carrier residing in a licensed radio spectrum and used by the radio network node in addition to the primary carrier.

8. The method of claim 1, wherein the radio network node comprises a radio base station of the wireless communication network.

9. A radio network node configured for operation in a wireless communication network, the radio network node comprising:

transceiver circuitry configured for wirelessly transmitting on a downlink carrier; and processing circuitry operatively associated with the communication circuitry and configured to:

transmit control signaling on the downlink carrier during a Discovery Reference Signal (DRS) occasion, conditioned on first performing a Clear Channel Assessment (CCA) procedure to assess availability of a frequency channel occupied by the downlink carrier; and perform the CCA procedure as an extended CCA, if the DRS occasion includes a transmission of data by the radio network node, and otherwise perform the CCA procedure as a short CCA that is shorter in duration than the extended CCA;

wherein the control signaling targets one or more wireless devices served by the radio network node, and, when the DRS occasion includes the transmission of the data, the data targets the one or more wireless devices served by the radio network node.

10. The radio network node of claim 9, wherein a timing structure used by the radio network node for transmitting on the downlink carrier comprises recurring frames, with each frame comprising a plurality of subframes, and wherein the DRS occasion spans one or more subframes.

11. The radio network node of claim 9, wherein the processing circuitry is configured to transmit the control signaling along with one or more DRS-related signals associated with the DRS occasion.

12. The radio network node of claim 9, wherein the control signaling comprises one or more of: an uplink grant, a downlink grant, a cross carrier grant, a joint grant, and common search-space control signaling.

13. The radio network node of claim 9, wherein the extended CCA comprises a Listen-Before-Talk (LBT) procedure that includes a random back-off procedure defining a deferment period and a CCA sensing slot, for use as needed in reassessing channel availability, and wherein the short CCA has a duration corresponding to the deferment period or the CCA sensing slot.

14. The radio network node of claim 9, wherein the frequency channel resides in unlicensed radio spectrum and the CCA procedure facilitates coexistence between the radio network node and any other nodes or devices that operate in the unlicensed radio spectrum independent of the wireless communications network.

15. The radio network node of claim 9, wherein the frequency channel resides in unlicensed radio spectrum and the downlink carrier is a secondary carrier synchronized with a primary carrier residing in a licensed radio spectrum and used by the radio network node in addition to the primary carrier.

16. The radio network node of claim 9, wherein the radio network node comprises a radio base station of the wireless communication network.

* * * * *